Sept. 21, 1965 R. A. HILLS 3,208,008

RANDOM WIDTH AND SPACED PULSED GENERATOR

Filed Feb. 12, 1963

INVENTOR.
RICHARD A. HILLS

BY

ATTORNEYS

United States Patent Office 3,208,008
Patented Sept. 21, 1965

3,208,008
RANDOM WIDTH AND SPACED PULSED GENERATOR

Richard A. Hills, La Jolla, Calif., assignor to the United States of America as represented by the Secretary of the Navy Filed Feb. 12, 1963, Ser. No. 258,089
6 Claims. (Cl. 331—78)
(Granted under Title 35, U.S. Code (1952), sec. 266)

The invention described herein may be manufactured and used by or for the Government of the United States of America for governmental purposes without the payment of any royalties thereon or therefor.

This invention relates to a random width and spaced pulse generator and more particularly to a random width and spaced pulse generator having predetermined minimum and maximum pulse widths.

According to the invention, the frequency of a clock pulsed generator is divided in half and utilized to trigger one input of a bistable multivibrator. Another output from the clock pulse generator is passed through an AND gate to the other trigger input of the bistable multivibrator. A third output from the clock pulse generator is delayed slightly and passed into a counter which has the property of supplying an output after four input pulses have passed. The output of this counter is utilized to gate the clock pulse generator output to the trigger input of the bistable multivibrator mentioned above. Thus, after two clock pulses the multivibrator is set to one condition and after four clock pulses it can be reset to its original state. This gives the maximum pulse width output at the output of the bistable multivibrator. To effect the random width and spacing, a random frequency pulse generator is also passed through a second AND gate to the same reset trigger terminal of the bistable multivibrator. The delayed clock pulse is also fed into one input of this second AND gate which then makes possible a reset condition after essentially one period of the clock pulse generator, this being the minimum pulse width possible. Obviously any width of pulse from one to four of the clock pulse generator periods can be generated. The delay also effects the random spacing feature, since after an attempted setting of the bistable multivibrator by the frequency divider at the output of the clock pulse generator a random pulse can come through, delayed only by the clock pulse generator delaying network, resetting the output bistable multivibrator after a negligible period. A further feature of the invention lies in ANDING the input to the counter with the set output of the output bistable multivibration. This prevents the counter from counting during the reset periods. The reset output of the bistable multivibrator can be differentiated and utilized to reset the counter to a zero condition each time the bistable multivibrator is set. This feature has a tendency to even up the probability or to increase the probability of maximum length pulses at the output.

It is thus an object of the present invention to provide a random width and spaced pulse generator in which the width of the output pulse is variable in discreet increments.

Another object of the invention is a provision of a random width and spaced pulse generator in which the minimum width can be determined and easily adjusted.

Still another object of the invention is the provision of a random width and spaced pulse generator in which the maximum pulse width is easily variable in discreet increments.

Still another object of the invention is the provision of a random width and spaced pulse generator which is simple, inexpensive and requires a minimum of maintenance and calibration.

Other objects and many of the attendant advantages thereof will become more readily apparent with reference to the following detailed description taken in conjunction with the drawings wherein.

Figure 1:
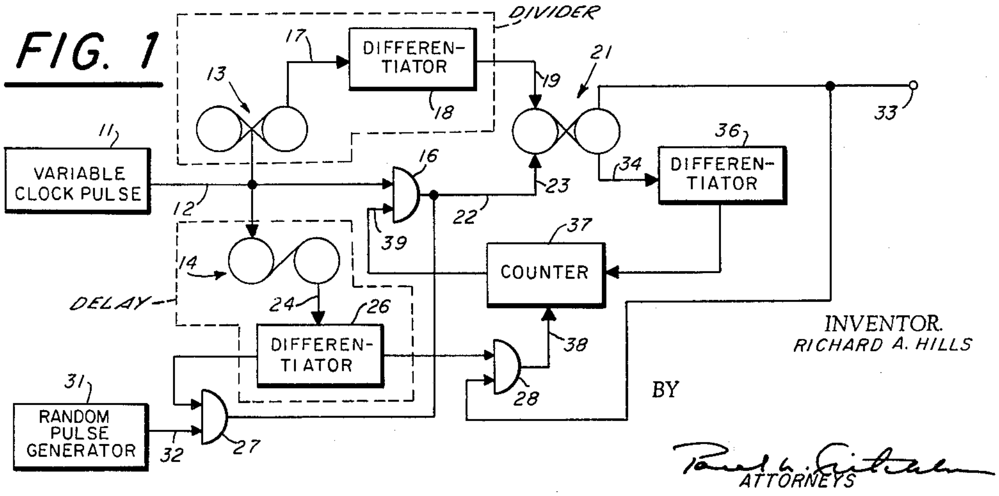
FIG. 1 is a block diagram of the preferred embodiment of the present invention.

Referring to FIG. 1 there is shown a variable frequency clock pulse generator 11 having an output at 12 which is coupled to the trigger inputs of bistable multivibrator 13 and monostable multivibrator 14, and to one input of AND gate 16. An output from bistable multivibrator 13 is taken at 17 and through differentiator 18 to one input 19 of bistable multivibrator 21. The output of gate 16 taken at 22 is fed to trigger input 23 of bistable multivibrator 21. An output 24 from monostable multivibrator 14 is passed through differentiator 26 to one input of AND gate 27 and to one input of AND gate 28. Random frequency pulse generator 31 is coupled to the other input of AND gate 27. The output of AND gate 27 is also connected to trigger input 23 of bistable multivibrator 21. The output of bistable multivibrator 21 is connected to output terminal 33 and to a second input of AND gate 28. Another output 34 of bistable multivibrator 21 is coupled through differentiator 36 to reset counter 37. The output of AND gate 28 is coupled to input 38 of counter 37, and the output of counter 37 is coupled to a second input 39 of AND gate 16.

Figure 2:
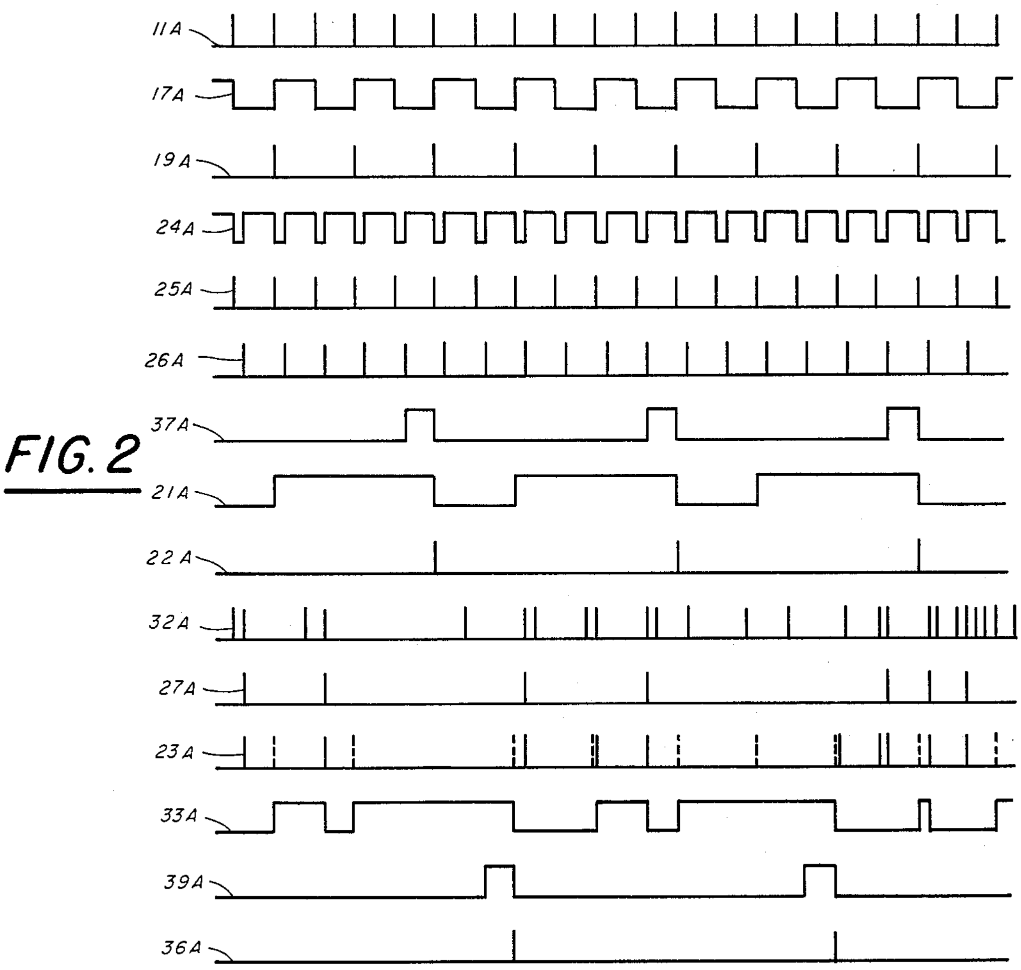
FIG. 2 is a series of waveforms found throughout the diagram shown in FIG. 1.

Each stage will now be identified regarding its input and output shown in FIG. 2. A series of pulses is shown at 11A which comprise the output of clock pulse generator 11. Multivibrator 13 can be any conventional bistable multivibrator which is triggered to each state by the trigger input from clock pulse generator 11. The output then at 17 of bistable multivibrator is shown as waveform **17*a* in FIG. 2, each change of condition coinciding with one of the pulse of 11*a*. Differentiator 18 merely differentiates the output of multivibrator 13 at input 19 of bistable multivibrator 21. This is shown at 19*a* in FIG. 2. In this regard, the positive front of waveform 17 is defferentiated as a positive pulse and the negative part of the waveform is not shown since it is not utilized. As is shown in FIG. 1 another output of clock pulse generator 11 is utilized to trigger a monostable multivibrator 14. Thus, with each clock pulse on bus 12 monostable multivibrator will go through a complete cycle and its output waveform at 24 is shown in FIG. 2 as waveform 24*a*. It is pointed out that multivibrator 14 is designed for an extremely asymmetrical waveform and the negative going cycles are actually narrower in width with respect to the positive going cycles than shown. This waveform is then differentiated in the positive direction in differentiator 26. The output waveform of differentiator 26 is then shown at 26*a*, it being delayed slightly from the clock pulses of 11*a*** in FIG. 2.

For purposes of explanation of set of waveforms are shown which assume no output from random frequency pulse generator 31 or with random frequency pulse generator 31 disabled. These waveforms are shown at **37*a*, the output from counter 37, the output from bistable multivibrator 21 at terminal 33, and 22*a* the output from coincidence or AND gate 16**.

With the random frequency pulse generator 31 in operation, its output is shown in FIG. 2 at **32*a*, with the output from AND gate 27 shown at 27*a* and the combined signals on input 23 of bistable multivibrator 21 shown in the solid lines in waveform 23*a*. The input at input terminal 18 shown in dotted lines superimposed on the waveforms 23*a*. The output of counter 37 with random frequency pulse generator 31 in operation is shown at 39*a* and the output of differentiator 36 with random frequency pulse generator 31 operating is shown at 36***a*. The system output at terminal 33 with the random frequency pulse generator in operation is shown at 33*a*.

*Operation*

Referring now collectively to FIGS. 1 and 2 the operation of the present invention will be described. As previously pointed out, a clock pulse shown at 11*a* in FIG. 2 is the output 12 of clock pulse generator 11. This clock pulse is utilized to trigger bistable multivibrator 13, the output of which is taken at 17 and differentiated at differentiator 18. The output of bistable multivibrator 13 is shown in waveform 17*a* of FIG. 2. It is pointed out that the change of states is coincident with clock pulses 11*a*. After differentiation in differentiator 18 waveform 19*a* in FIG. 2 is present at input 19 of bistable multivibrator 19. Waveform 19*a* is a series of pulses coinciding with a positive going wave-front of the output of multivibrator 13 and coincident with every other clock pulse. Hence, multivibrator 13 and differentiator 18 comprise a frequency divider dividing by 2. The output 12 of clock pulse generator 11 is also applied to trigger monostable multivibrator 14. The output waveform is shown at 24*a* in FIG. 2 and appears on line 24 in FIG. 1. As previously mentioned, this waveform is asymmetrical and is actually much more asymmetrical than shown i.e. the negative going pulse of waveform 24*a* is shown wider for ease of illustration and explanation. The output of multivibrator 14 is then differentiated in differentiator 26, this waveform being shown at 26*a* of FIG. 2. Thus, the pulses appearing as waveform 26*a* will be of the same frequency and period as clock pulses 11*a* but will be delayed by the period of the negative going cycle of multivibrator 14*a*. Hence, multivibrator 14 and differentiator 26 comprise a delaying network and can be replaced if desired by any delaying means such as a passive delay line. Assuming for the purpose of explanation random pulse generator 31 is disabled, then the output of differentiator 26 applied solely through AND gate 28 to the input of counter 37. Counter 37 counts only during one stable state of bistable multivibrator 21. This is accomplished by ANDING the output of bistable multivibrator 21 from terminal 33 to one input of AND gate 28. Assuming that when multivibrator 21 has responded to a pulse from differentiator 18 it is in a "set" condition, and at that time an output is seen at output terminal 33, during this period or condition counter 37 will receive pulses from differentiator 26 through AND gate 28. Hence, after the first pulse of waveform 19*a* multivibrator 21 is set as shown in waveform 21*a* and counter 37 begins counting the output from differentiator 26. Assume further that counter 37 is set or adjusted to yield an output at 39 after four input pulses. The output of counter 37 is shown as waveform 37*a*, and on the fourth pulse after multivibrator 21 is set line 39 will see a positive going waveform as shown in waveform 37*a*. Notice this is in concidence with the delayed pulse 26*a*. AND gate 16 is then in a condition to pass the next clock pulse from clock pulse generator 11 which resets multivibrator 21 as shown in waveform 21*a* and delivers a second output at 34 which is differentiated in differentiator 36 and resets counter 37 to its original state as shown in waveform 37*a*. Multivibrator 21 is then waiting for the next set pulse from differentiator 18, and the cycle repeats itself. Thus, with random pulse generator 31 out of the circuit, the output waveform appears as shown in waveform 21*a* of FIG. 2 which will be a series of long output pulses evenly spaced therebetween.

Assuming now that the random frequency pulse generator 31 is connected in the circuit it will have a random pulse output of which waveform 32*a* is representive. This will appear on line 32 which is one input to AND gate 27. Any time the output from the random frequency pulse generator 31 is coincidence with the output from the differentiator 26 a pulse will appear at the output of AND gate 27, and will be applied in parallel with the output from AND gate 16 to reset multivibrator 21. It is pointed out here that should a reset pulse at 23 and a set pulse at 19 be coincident, the multivibrator 21 will change its state i.e. if it is in a set state it will go to the reset state and if it is in the reset state it will revert to the set state. Waveform 27*a* is then the output of AND gate 27 which occurs whenever waveform 32*a* and waveform 26*a* are in coincidence. The reset pulses from AND gate 27 will serve two functions, the first will be to reset multivibrator 21 randomly (the minimum time being the period of the clock pulse generator plus the delay time in multivibrator 14), and should a random pulse not appear for an extended period counter 37 will yield an output after four clock pulse periods which set the maximum pulse width. The other function of random pulse generator 31 is seen in varying the spacing of the output pulses at 33. If a random pulse comes along immediately after multivibrator is set by a pulse from differentiator 18, i.e., displaced in time by the delayed time multivibrator 14, multivibrator 21 will be reset immediately, the set time being short enough to be negligible, resulting in an extended space between pulses. A typical output of multivibrator 21 at output terminal 33 is shown by waveform 33*a*, and, as desired, the spacing is varied as well as the pulse widths. The combined output or the output of counter 37 shown at 39*a* when pulse generator 31 is operating has reduced the frequency somewhat of the output waveform due to the frequency resetting of counter 37 every time an output from AND gate 27 resets multivibrator 21. The reset waveform is shown at 36*a*.

It is pointed out that the frequency of clock pulse generator 11 can be varied which will vary the minimum and maximum widths of the output pulse taken at 33, together with varying the time inbetween pulses. This can be set up so that the output at 33 can sound like a series of random Morse code characters for example. The maximum pulse width can be varied independently by varying the number of counts required for counter 37 to yield an output to AND gate 16. The likelihood of coincidence in AND gate 27 can be enhanced, if desired, by increasing the width of the output pulses of random frequency pulse generator 31.

Obviously many modifications and variations of the present invention are possible in the light of the above teachings. It is, therefore, to be understood that within the scope of the appended claims the invention may be practiced otherwise than as specifically described.

What is claimed is:

1. A random width and spaced pulse generator comprising:

a clock pulse generator;

dividing means having an input connected to said clock pulse generator;

a bistable multivibrator, the output of said first dividing means connected to said bistable multivibrator for triggering said bistable multivibrator in one of its stable states;

delaying means connected to said clock pulse generator for delaying said clock pulses;

counting means connected to an output of said delaying means;

a first AND gate having one input connected to said clock pulse generator and another input connected to an output of said counting means, said first AND gate having an output connected to said bistable multivibrator triggering said bistable multivibrator in the other of its stable states;

a random spaced pulse generator;

a second AND gate having one input connected to said random spaced pulse generator and another input connected to said output of said delaying means, said second AND gate having an output connected to the output of said first AND gate;

whereby the output of said bistable multivibrator will be a square wave of random width and spacing.

2. The random width and spaced pulse generator of claim 1 wherein said delaying means comprises:

a monostable multivibrator and differentiating means in serial relationship.

3. The random width and spaced pulse generator of claim 1 wherein said dividing means comprises:

a bistable multivibrator and differentiating means in serial relationship.

4. A random width and spaced pulse generator comprising:

a clock pulse generator;

dividing means having an input connected to said clock pulse generator;

a bistable multivibrator, the output of said first dividing means connected to said bistable multivibrator for triggering said bistable multivibrator in one of its stable states;

delaying means connected to said clock pulse generator for delaying said clock pulses;

a first AND gate having one input connected to an output of said delaying means and a second input connected to an output of said bistable multivibrator;

counting means having an input connected to an output of said first AND gate;

a second AND gate having one input connected to said clock pulse generator and another input connected to an output of said counting means, said second AND gate having an output connected to said bistable multivibrator triggering said bistable multivibrator in the other of its stable states;

a random spaced pulse generator;

a third AND gate having one input connected to said random spaced pulse generator and another input connected to said output of said delaying means, said third AND gate having an output connected to the output of said second AND gate; and whereby the output of said bistable multivibrator will be a square wave of random width and spacing.

5. The random width and spaced pulse generator of claim 4 wherein said delaying means comprises:

a monostable multivibrator and differentiating means in serial relationship.

6. The random width and spaced pulse generator of claim 4 wherein said dividing means comprises;

a bistable multivibrator and differentiating means in serial relationship.

References Cited by the Examiner

UNITED STATES PATENTS

| | | | |
|---|---|---|---|
| 2,553,284 | 5/51 | Sunstein | 331—78 |
| 2,607,896 | 8/52 | Chambers | 331—78 |

ROY LAKE, *Primary Examiner.*

KATHLEEN H. CLAFFY, *Examiner.*